(No Model.)
J. BOOTH.
METHOD OF AND APPARATUS FOR MAKING RING TRAVELERS.
No. 581,532. Patented Apr. 27, 1897.
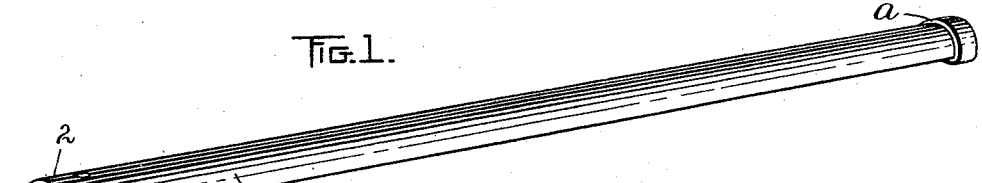
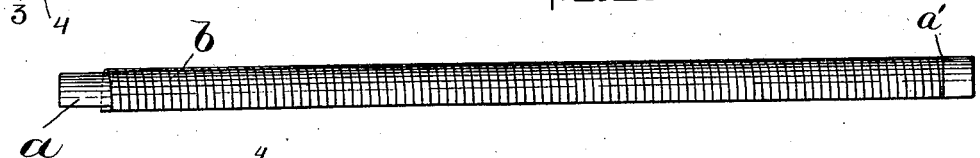
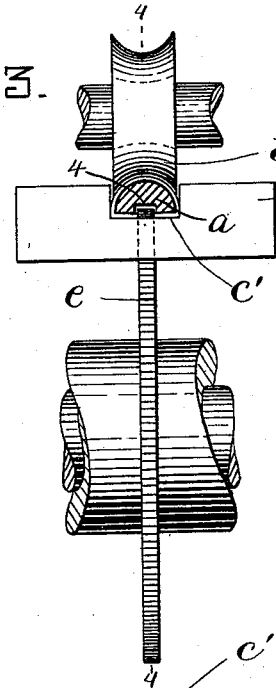
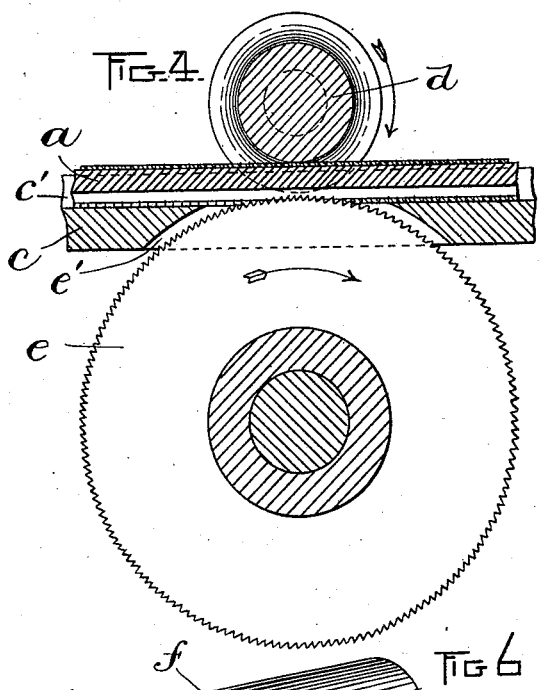
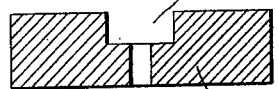
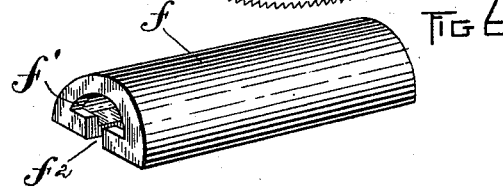
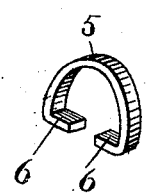
WITNESSES:
E. Batchelder
P. W. Pezzetti
INVENTOR:
John Booth
by Wright Brown & Quinby
attys.
THE NORRIS PETERS CO., PHOTO-LITHO., WASHINGTON, D. C.

UNITED STATES PATENT OFFICE.

JOHN BOOTH, OF CENTRAL FALLS, RHODE ISLAND, ASSIGNOR OF ONE-HALF TO CHARLES D. WOOD, OF LINCOLN, RHODE ISLAND.

METHOD OF AND APPARATUS FOR MAKING RING-TRAVELERS.

SPECIFICATION forming part of Letters Patent No. 581,532, dated April 27, 1897.

Application filed January 4, 1897. Serial No. 617,890. (No model.)

*To all whom it may concern:*

Be it known that I, JOHN BOOTH, of Central Falls, in the county of Providence and State of Rhode Island, have invented certain new and useful Improvements in Methods of and Apparatus for Making Ring-Travelers, of which the following is a specification.

This invention has for its object to provide means for rapidly and economically manufacturing ring-travelers for use in ring-spinning machines.

The invention consists, first, in an apparatus comprising a mandrel formed to fit the interior of a ring-traveler, said mandrel being semicircular upon one side and flattened upon the other and provided with a longitudinal groove in its flattened side, a stationary bed or table adapted to support the mandrel and the wire coiled helically thereon, and a cutter which is arranged to enter the groove in the mandrel and sever the portions of the convolutions that extend across the same, the said cutter being of sufficient thickness to remove a considerable part of the flattened portion of each convolution.

The result of the operation of my improved apparatus is the production of a series of ring-travelers, each constituting one of the convolutions of the wire helix wound upon said mandrel, excepting the part that was cut away by the cutter, each traveler being, therefore, a section of a helix and having its ends or arms which project under and engage the lips of the traveler supporting and guiding ring arranged substantially parallel with each other, but in different planes. The travelers thus formed may be used without alteration of their form or they may be subjected to pressure to bring their ends into alinement.

My invention also includes certain improvements in the method of making ring-travelers, all of which I will now proceed to describe and claim.

Of the accompanying drawings, forming a part of this specification, Figure 1 represents a perspective view of the helix-forming mandrel. Fig. 2 represents a side view of the mandrel with a wire wound helically thereon. Fig. 3 represents an end elevation of my improved apparatus, including the mandrel shown in Figs. 1 and 2. Fig. 4 represents a section on line 4 4 of Fig. 3. Fig. 5 represents a perspective view of the supporting bed or table. Fig. 6 represents a perspective view of one of the parts used for pressing the helical travelers into the form shown in Fig. 9. Fig. 7 represents a sectional view of the part shown in Fig. 6 and a side view of the mandrel and a series of travelers thereon. Fig. 8 represents a perspective view of one of the travelers with its points in different planes. Fig. 9 represents a view of a traveler bent to bring its points into the same plane by the aid of the device shown in Figs. 6 and 7.

The same letters and numerals of reference indicate the same parts in all the figures.

In the drawings, $a$ represents a mandrel, one side 2 of which is substantially semicircular, while the other side 3 is substantially flat and provided with a longitudinal groove 4. The cross-section of the mandrel $a$ corresponds to the internal shape of the ring-travelers to be produced, the semicircular side 2 fitting the under side of the arch or body portion 5 of the traveler, (shown in Fig. 8,) while the flattened side 3 fits the end portions or arms 6 6 of the traveler. A length of wire $b$ of suitable form, which has been suitably annealed, is wound helically upon the mandrel $a$, the wire conforming closely to the cross-section of the mandrel. The ends of the wire being secured to the mandrel in any suitable way, the mandrel and wire helix are placed upon a bed or support $c$, having a groove $c'$ formed to receive the mandrel and helix, as shown in Figs. 3 and 4.

$d$ represents a roll which bears on the wire helix at a point opposite the cutter $e$. Said roll may be positively rotated to serve as a feed-roll. The cutter is of sufficient thickness to practically fill the width of the groove 4, and when rapidly rotated cuts away portions of the convolutions of the helix extending across said groove, the width of the groove and the thickness of the cutter being substantially equal to the space between the ends of the ring-travelers to be produced. The mandrel and helix are passed between the roll and cutter until all the convolutions have been severed by the cutter, after which the mandrel may be removed from the bed and the severed convolutions removed from the mandrel and suitably tempered, the wire having been annealed prior to the operations above described. The convolutions of the helix are now separated from each other, and each constitutes a ring-traveler of the general form shown in Fig. 8, the helical form imparted to the wire causing the ends 6 6 of the traveler to stand substantially parallel with each other and in different planes, this form of traveler being preferred by me, because it runs more smoothly upon the ring than the ordinary form of traveler, in which the ends 6 6 are in the same plane, as shown in Fig. 9. If desired, however, the helical travelers may be bent or straightened, so that their ends will be in the same plane, as shown in Fig. 9, by placing the mandrel $a$, with the severed convolutions thereon, in a tubular receptacle $f$, having at one end a flange $f''$, which acts as a support for one end of the series or column of travelers. By now exerting pressure upon the opposite end of the said series or column all the travelers will be straightened or bent so that their ends will lie in the same plane, after which they may be removed and tempered, as above described. The mandrel may be provided with a shoulder $a'$ to exert straightening pressure on the travelers, the mandrel being moved endwise.

It will be seen that the method of making ring-travelers above described involves very simple machinery or apparatus and enables the travelers to be produced very rapidly and cheaply as compared with the machines now in use, in which the travelers are made by cutting blanks one at a time from a continuous wire and bending said blanks into traveler form one at a time by successive operations. The knives used in such machines to sever the wire become dull and form burs on the ends of the travelers. I avoid this objection by using a milling-cutter to form the ends of the travelers, thus preventing the formation of burs thereon.

The receptacle $f$ may receive the mandrel and helix prior to the cutting operation, and may be passed, with the mandrel and helix, between the roll $d$ and cutter $e$, the receptacle $f$ having a slot $f^2$ to receive the cutter.

I do not limit myself to the form and construction of the details of mechanism here shown, and may variously modify the same without departing from the spirit of my invention.

I claim—

1. A mandrel for receiving a coil of wire for forming ring-travelers, said mandrel having a substantially semicircular side and a substantially flat side, the latter being provided with a longitudinal groove or depression to receive a cutter, said groove being of a width substantially equal to the space between the ends of the ring-travelers to be produced.

2. The combination of a mandrel having a substantially semicircular side, a substantially flat side, and a longitudinal groove in said flat side, a rest or bed formed to support the semicircular side of the mandrel and a coil of wire thereon, and a cutter arranged to sever the convolutions on the grooved side of the mandrel and to enter the groove therein.

3. The combination of a longitudinally-grooved mandrel formed to fit the interior of a ring-traveler, a rest or bed formed to support the mandrel and a coil of wire thereon, a cutter arranged to act on the convolutions on the grooved side of the mandrel, and a roll arranged to support the mandrel and wire opposite the cutter.

4. The improved method of making ring-travelers, which consists in softening a length of wire, winding it helically on a mandrel, flattening portions of the convolutions of the helix, severing said flattened portions to convert the helix into detached parts, each of ring-traveler form, pressing the detached parts to bring their ends into alinement with each other, and then tempering said parts.

5. As a means for straightening helical ring-travelers, a tubular receptacle having a stop at one end, and a mandrel adapted to enter said receptacle, and provided with a shoulder adapted to exert pressure on a series of travelers on said mandrel.

In testimony whereof I have signed my name to this specification, in the presence of two subscribing witnesses, this 29th day of December, A. D. 1896.

JOHN BOOTH.

Witnesses:
C. F. BROWN,
CHARLES D. WOOD.